United States Patent
Cheng et al.

(10) Patent No.: US 7,603,328 B2
(45) Date of Patent: Oct. 13, 2009

(54) DUAL-PHASE VIRTUAL METROLOGY METHOD

(75) Inventors: Fan-Tien Cheng, Tainan (TW); Hsien-Cheng Huang, Taoyuan (TW); Chi-An Kao, Tainan (TW)

(73) Assignee: National Cheng Kung University, Tainan (TW)

( * ) Notice: Subject to any disclaimer, the term of this patent is extended or adjusted under 35 U.S.C. 154(b) by 329 days.

(21) Appl. No.: 11/879,562

(22) Filed: Jul. 18, 2007

(65) Prior Publication Data

US 2008/0306625 A1    Dec. 11, 2008

(30) Foreign Application Priority Data

Jun. 8, 2007    (TW) ............... 96120862 A

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/02 | (2006.01) |

(52) U.S. Cl. ..................................... 706/15
(58) Field of Classification Search ............ 706/15
See application file for complete search history.

(56) References Cited

U.S. PATENT DOCUMENTS

| | | | | |
|---|---|---|---|---|
| 6,700,648 B2 * | 3/2004 | Jun et al. | ............... | 355/77 |
| 7,092,922 B2 * | 8/2006 | Meng et al. | ............... | 706/16 |
| 7,209,798 B2 * | 4/2007 | Yamashita et al. | ........... | 700/121 |
| 7,324,193 B2 * | 1/2008 | Lally et al. | ............... | 356/237.2 |
| 7,328,418 B2 * | 2/2008 | Yamashita et al. | ............ | 716/10 |
| 7,359,759 B2 * | 4/2008 | Cheng et al. | ................ | 700/121 |
| 7,437,199 B2 * | 10/2008 | Willis et al. | ................ | 700/21 |
| 7,477,960 B2 * | 1/2009 | Willis et al. | ................ | 700/121 |
| 7,493,185 B2 * | 2/2009 | Cheng et al. | ................ | 700/108 |
| 7,502,709 B2 * | 3/2009 | Funk et al. | .................. | 702/127 |
| 7,533,006 B2 * | 5/2009 | Huddleston et al. | ........... | 703/2 |
| 7,567,700 B2 * | 7/2009 | Funk et al. | .................. | 382/144 |

OTHER PUBLICATIONS

NN-Based Key-Variable Selection Method for Enhancing Virtual Metrology Accuracy Tung-Ho Lin; Fan-Tien Cheng; Wei-Ming Wu; Chi-An Kao; Aeo-Juo Ye; Fu-Chien Chang; Semiconductor Manufacturing, IEEE Transactions on vol. 22, Issue 1, Feb. 2009 pp. 204-211 Digital Object Identifier 10.1109/TSM.2008.2011185.*

(Continued)

*Primary Examiner*—Michael B Holmes
(74) *Attorney, Agent, or Firm*—Moser IP Law Group

(57) ABSTRACT

A dual-phase virtual metrology method is disclosed for considering both promptness and accuracy by generating dual-phase virtual metrology (VM) values, wherein a Phase-I conjecture step emphasizes promptness by immediately calculating the Phase-I virtual metrology value ($VM_I$) of a workpiece once the entire process data of the workpiece are completely collected; and a Phase-II conjecture step intensifies accuracy, which does not re-calculate the Phase-II virtual metrology values ($VM_{II}$) of all the workpieces in the cassette until an actual metrology value (required for tuning or re-training purposes) of a selected workpiece in the same cassette is collected. Besides, the accompanying reliance index (RI) and global similarity index (GSI) of each $VM_I$ and $VM_{II}$ are also generated.

17 Claims, 6 Drawing Sheets

OTHER PUBLICATIONS

Accuracy and Real-Time Considerations for Implementing Various Virtual Metrology Algorithms Yu-Chuan Su; Tung-Ho Lin; Fan-Tien Cheng; Wei-Ming Wu; Semiconductor Manufacturing, IEEE Transactions on vol. 21, Issue 3, Aug. 2008 pp. 426-434 Digital Object Identifier 10.1109/TSM.2008.2001219.*

Evaluating Reliance Level of a Virtual Metrology System Fan-Tien Cheng; Yeh-Tung Chen; Yu-Chuan Su; Deng-Lin Zeng; Semiconductor Manufacturing, IEEE Transactions on vol. 21, Issue 1, Feb. 2008 pp. 92-103 Digital Object Identifier 10.1109/TSM.2007.914373.*

Dual-Phase Virtual Metrology Scheme Fan-Tien Cheng; Hsien-Cheng Huang; Chi-An Kao; Semiconductor Manufacturing, IEEE Transactions on vol. 20, Issue 4, Nov. 2007 pp. 566-571 Digital Object Identifier 10.1109/TSM.2007.907633.*

An Approach for Factory-Wide Control Utilizing Virtual Metrology Khan, A.A.; Moyne, JR.; Tilbury, D.M.; Semiconductor Manufacturing, IEEE Transactions on vol. 20, Issue 4, Nov. 2007 pp. 364-375 Digital Object Identifier 10.1109/TSM.2007.907609.*

Virtual Metrology models for predicting physical measurement in semiconductor manufacturing Ferreira, A.; Roussy, A.; Conde, L.; Advanced Semiconductor Manufacturing Conference, 2009. ASMC '09. IEEE/SEMI May 10-12, 2009 pp. 149-154 Digital Object Identifier 10.1109/ASMC.2009.5155973.*

Automatic virtual metrology system design and implementation Yi-Ting Huang; Hsien-Cheng Huang; Fan-Tien Cheng; Tai-Siang Liao; Fu-Chien Chang; Automation Science and Engineering, 2008. Case 2008. IEEE International Conference on Aug. 23-26, 2008 pp. 223-229 Digital Object Identifier 10.1109/COASE.2008.4626524.*

Developing a selection scheme for dual virtual-metrology outputs Wei-Ming Wu; Fan-Tien Cheng; Deng-Lin Zeng; Tung-Ho Lin; Jyun-fang Chen; Automation Science and Engineering, 2008. Case 2008. IEEE International Conference on Aug. 23-26, 2008 pp. 230-235 Digital Object Identifier 10.1109/COASE.2008.4626525.*

* cited by examiner

US 7,603,328 B2

DUAL-PHASE VIRTUAL METROLOGY METHOD

RELATED APPLICATIONS

This application claims priority to Taiwan Application Serial Number 96120862, filed Jun. 8, 2007, which is herein incorporated by reference.

BACKGROUND

1. Field of Invention

The present invention relates to a virtual metrology (VM) method. More particularly, the present invention relates to a dual-phase virtual metrology method having promptness and accuracy.

2. Description of Related Art

In the semiconductor industry, run-to-run (R2R) advanced process control (APC) is widely applied to semiconductor and TFT-LCD factories for improving process capability. As defined in SEMI E133 specification, R2R control is the technique of modifying recipe parameters or the selection of control parameters between runs to improve processing performance. A run can be a batch, a lot, or an individual workpiece. A workpiece may represent a wafer for the semiconductor industry or a glass for the TFT-LCD industry. When L2L control is applied, only a single workpiece in the lot is required to be measured for feedback and feedforward control purposes. However, as device dimension shrinks further, tighter process control is needed. In this case, L2L control may not be accurate enough and workpiece-to-workpiece (W2W) control becomes essential for critical stages. As such, each workpiece in the lot should be measured. To accomplish this requirement, large amounts of metrology tools will be required and production cycle time will also be increased significantly. Furthermore, metrology delays, which are inevitable when real measurements are performed, will cause complicated control problems and degrade the APC performance.

Hence, there is a need to provide a virtual metrology method for providing a (virtual) measurement value with respect to each workpiece without actually measuring each workpiece, thereby performing W2W control, for example, by still using the measurement frequency of L2L control, i.e. only one single workpiece in the entire lot is spot-tested. However, generally speaking, both promptness and accuracy have to be taken into account when the virtual metrology method is used to feed virtual metrology (VM) values into W2W control, or the aforementioned requirements of W2W control cannot be met.

SUMMARY

Hence, there is a need to develop a dual-phase virtual metrology method for meeting the requirements of W2W control.

One aspect of the present invention is to provide a dual-phase virtual metrology method for providing dual-phase metrology values to meet the requirements of promptness and accuracy simultaneously.

In accordance with the aforementioned aspect, a dual-phase virtual metrology method is provided. According to an embodiment of the present invention, in the dual-phase virtual metrology method, at first, a plurality of sets of historical process data belonging to a production equipment are obtained, and a plurality of historical measurement values from a measurement equipment are obtained, wherein the historical measurement values are the measurement values of the workpieces which are manufactured in accordance with the sets of historical process data, respectively. Thereafter, a first conjecture model is established by using the sets of historical process data and the historical measurement values, wherein the first conjecture model is built in accordance with a conjecture algorithm, wherein the conjecture algorithm can be such as a multi-regression algorithm, a neural network (NN) algorithm, or any other prediction algorithm. Further, in the dual-phase virtual metrology method, a first reference model is established by using the aforementioned sets of historical process data and the aforementioned historical measurement values, wherein the first reference model is built in accordance with a reference algorithm, and the reference algorithm is different from the aforementioned conjecture algorithm, and can be such as a multi-regression algorithm, a neural network algorithm, or any other prediction algorithm. Further, in the dual-phase virtual metrology method, a first statistical distance model is established by using the aforementioned sets of historical process data in accordance with a statistical distance algorithm, wherein the statistical distance algorithm can be such as a Mahalanobis distance algorithm.

Thereafter, the dual-phase virtual metrology method proceeds to waiting for collecting the process data of a plurality of workpieces from the production equipment. After the collection of the process data of a certain workpiece from the production equipment is completed, a phase-one conjecture step is promptly performed. In the phase-one conjecture step, the process data of the certain workpiece is inputted into the first conjecture model, thereby computing a phase-one virtual metrology value ($VM_I$) for meeting the requirement of promptness. In the phase-one conjecture step, the process data of the certain workpiece is inputted into the first reference model, thereby computing a first reference prediction value. Then, the overlap area between the statistical distribution of the phase-one virtual metrology value of the certain workpiece and the statistical distribution of the first reference prediction value is calculated, thereby generating the reliance index (RI) of the phase-one virtual metrology value of the certain workpiece, wherein the reliance index is higher when the overlap area is larger, representing that the reliance level of the phase-one virtual metrology value corresponding thereto is higher. In the phase-one conjecture step, the process data of the certain workpiece obtained from the production equipment is also inputted into the first statistical distance model, thereby computing the global similarity index (GSI) for the process data corresponding to the phase-one virtual metrology value of the certain workpiece.

Commonly, a production system will select one workpiece (a selected workpiece) in each cassette, and send the selected workpiece to the measurement equipment for measurement; for example, one of 25 wafers contained in a cassette is selected for spot testing. When the actual measurement value of the selected workpiece is obtained from the measurement equipment, a phase-two conjecture step is performed. In the phase-two conjecture step, the process data and actual measurement value of the selected workpiece is added to the aforementioned sets of historical process data and the historical measurement values to retrain the first conjecture model and the first reference model; or the process data and actual measurement value of the selected workpiece is used to tune the first conjecture model and the first reference model, thereby turning the first conjecture model and the first reference model into a second conjecture model and a second reference model. Thereafter, the process data of all the workpieces in the cassette belonging to the selected workpiece is inputted into the second conjecture model and the second reference model, thereby re-computing a phase-two virtual metrology value ($VM_{II}$) and a second reference prediction value of each workpiece in the cassette. Then, the overlap area between the statistical distribution of the phase-two virtual metrology value of each workpiece in the aforementioned cassette and the statistical distribution of the second reference prediction value is calculated, thereby generating the reliance index of the phase-two virtual metrology value of each workpiece in the cassette, wherein the reliance index is higher when the overlap area is larger, representing that the reliance level of the phase-two virtual metrology value corresponding thereto is higher. The phase-two virtual metrology value re-calculated herein is more accurate than the phase-one virtual metrology value previously calculated, thus meeting the requirement of accuracy. Meanwhile, the first conjecture model and the first reference model can be updated with the second conjecture model and the second reference model for computing the phase-one virtual metrology value with its reliance index of the workpiece subsequently manufactured by the production equipment.

In the phase-two conjecture step, the process data of the selected workpiece is added to the sets of historical process data to retrain the first statistical distance mode; or the process data of the selected workpiece is used to tune the first statistical distance model, thereby turning the first statistical distance model into a second statistical distance model. Then, the process data of all the workpieces in the cassette belonging to the selected workpiece is inputted into the second statistical distance model, thereby re-computing the global similarity index for the process data corresponding to the phase-two virtual metrology value of each workpiece in the cassette. Meanwhile, the first statistical distance model is updated with the second statistical distance model for computing the global similarity index of the process data corresponding to the phase-one virtual metrology value of the workpiece subsequently manufactured by the production equipment.

Further, in the dual-phase virtual metrology method, a process data preprocessing step is performed for deleting all the anomalous process data and selecting important parameters from the process data of each of the workpieces obtained from the production equipment.

Further, in the dual-phase virtual metrology method, a metrology data preprocessing step is performed for filtering out anomalous data in the actual measurement value of the selected workpiece.

According to another embodiment of the present invention, in the phase-two conjecture step, the scheme for determining if the conjecture model, the reference model and the statistical distance model need retraining or tuning is based on that: when the production equipment has been idled for a predetermined period of time or an instruction of manual activation is issued, then those models need retraining, otherwise tuning is executed.

Hence, with the application of the embodiments of the present invention, dual-phase virtual metrology values and their reliance indexes and global similarity indexes are provided for having the features of promptness and accuracy, thus meeting the requirements of W2W control.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
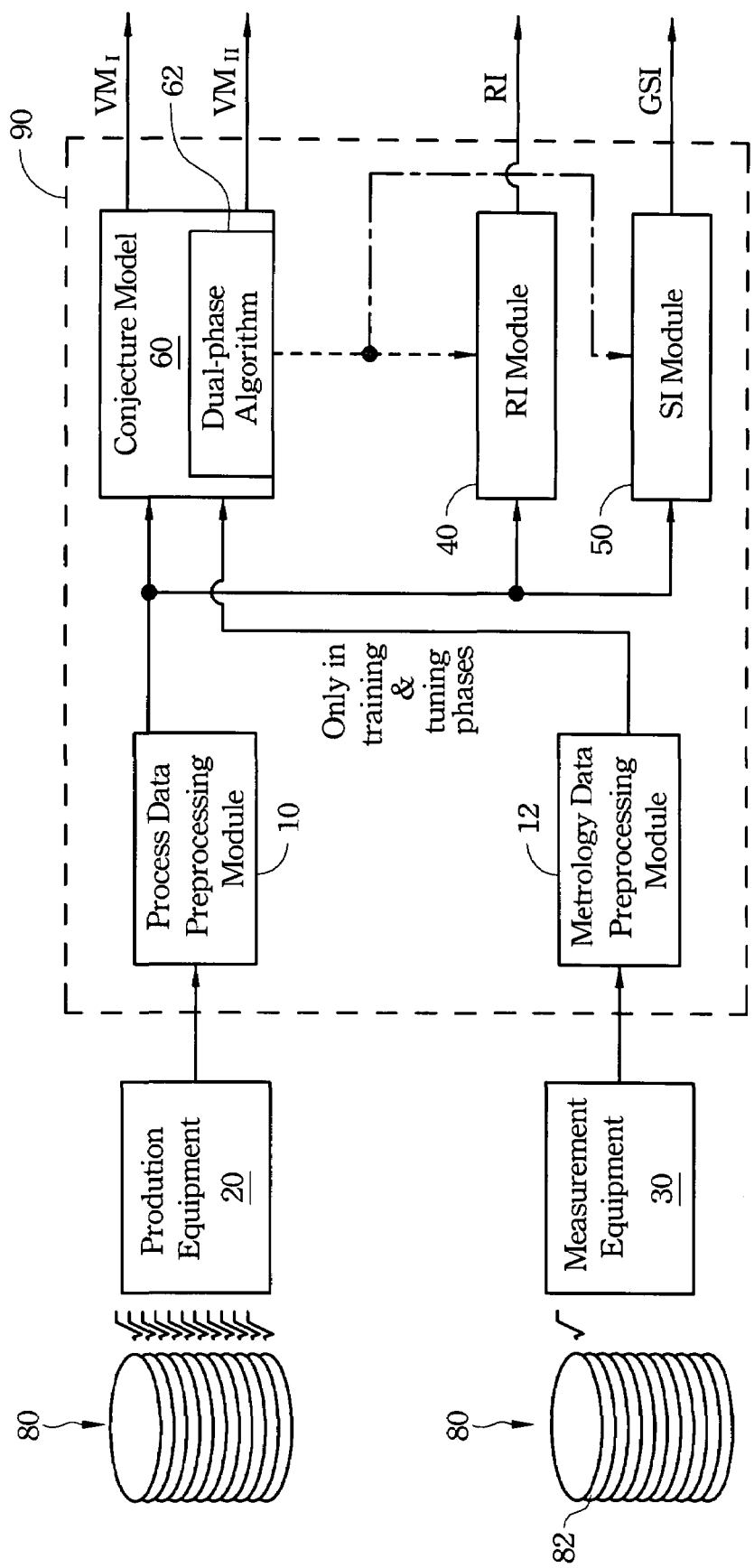
FIG. 1 is a schematic block diagram showing a dual-phase virtual metrology system according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Referring to FIG. 1, FIG. 1 is a schematic block diagram showing a dual-phase virtual metrology system according to an embodiment of the present invention. The dual-phase virtual metrology system 90 of this embodiment comprises a process data preprocessing module 10, a metrology data preprocessing module 12, a conjecture model 60, a reliance index (RI) module 40 and a similarity index (SI) module 50. The data preprocessing module 10 processes and standardizes raw process data from a piece of production equipment 20, and selects important parameters from all of the original parameters in process data so as to prevent unimportant parameters from affecting the prediction accuracy. The metrology data preprocessing module 12 process the measurement values from a piece of measurement equipment 30 for filtering out anomalous data therein. The conjecture model 60 uses a dual-phase algorithm 62 and a conjecture algorithm to conjecture phase-one virtual metrology values ($VM_I$) and phase-two virtual metrology values ($VM_{II}$) for a plurality of workpieces (not labeled) in a cassette 80. The conjecture algorithm can be selected from various prediction algorithms such as a multi-regression algorithm and a neural network algorithm. The reliance index module 40 generates the RI value to estimate the reliance levels of the phase-one and phase-two virtual metrology values ($VM_I$ and $VM_{II}$). The similarity index module 50 calculates a global similarity index for evaluating the degree of similarity between the input-set process data and all of the sets of historical process data in the conjecture model 60 for training and building the conjecture model, wherein the global similarity index is used for assisting the reliance index in gauging the degree of reliance of the virtual metrology system.

Prior to the operation of the conjecture model 60, a plurality of sets of process data (historical process data) obtained from the production equipment 20 and quality measurement data (historical measurement values) obtained from the measurement equipment 30 are transmitted respectively to the process data preprocessing module 10 and the metrology data preprocessing module 12 for data preprocessing. These preprocessed and standardized process data and quality measurement data are the input data required by the conjecture model 60. Thereafter, the sets of historical process data and the historical measurement values corresponding thereto are used to train (establish) the conjecture model 60, such as a neural network (NN) conjecture model. The conjecture model 60 has a dual-phase algorithm 62 used for computing the phase-one and phase-two virtual metrology values ($VM_I$ and $VM_{II}$) with their reliance indexes (RIs) and global similarity indexes (GSIs). The operation method of the dual-phase algorithm 62 will be described after the algorithms related to the RI and GSI are explained.

The following presents the algorithms related to the RI and GSI and explains their operating procedures.

Reliance Index (RI)

Referring to Table 1, n sets of historical data are assumed to be collected, including process data ($X_i$, i=1, 2, ..., n) and the corresponding actual measurement values ($y_i$, i=1, 2, ..., n), where each set of process data contains p individual parameters (from parameter 1 to parameter p), namely $X_i = [x_{i,1}, x_{i,2}, \ldots, x_{i,p}]^T$. Additionally, (m−n) sets of process data in actual production were also collected, but no actual measurement values are available besides $y_{n+1}$. That is, only the first among (m−n) pieces of the products is selected and actually measured. In the current manufacturing practice, the actual measurement value $y_{n+1}$ obtained is used to infer and evaluate the quality of the (m−n−1) pieces of the products.

TABLE 1

| Sample Data Set | Parameter 1 | Parameter 2 | ... | Parameter p | Actual Measurement Value |
|---|---|---|---|---|---|
| 1 | $x_{1,1}$ | $x_{1,2}$ | ... | $x_{1,p}$ | $y_1$ |
| 2 | $x_{2,1}$ | $x_{2,2}$ | ... | $x_{2,p}$ | $y_2$ |
| ... | ... | ... | ... | ... | ... |
| n | $x_{n,1}$ | $x_{n,2}$ | ... | $x_{n,p}$ | $y_n$ |
| n + 1 | $x_{n+1,1}$ | $x_{n+1,2}$ | ... | $x_{n+1,p}$ | $y_{n+1}$ |
| n + 2 | $x_{n+2,1}$ | $x_{n+2,2}$ | ... | $x_{n+2,p}$ | Zip |
| ... | ... | ... | ... | ... | ... |
| m | $x_{m,1}$ | $x_{m,2}$ | ... | $x_{m,p}$ | Zip |

As shown in Table 1, $y_1, y_2, \ldots, y_n$ are historical measurement values, and $y_{n+1}$ is the actual measurement value of the first piece of the products being manufactured. Generally, a set of actual measurement values ($y_i$, i=1, 2, ..., n) is a normal distribution with mean $\mu$ and standard deviation $\sigma$, namely $y_i \sim N(\mu, \sigma^2)$.

All the actual measurement values can be standardized in terms of the mean and standard deviation of the sample set ($y_i$, i=1, 2, ..., n). Their standardized values (also called z scores) $Z_{y_1}, Z_{y_2}, \ldots, Z_{y_n}$ are thus derived, where each z score has mean zero and standard deviation one, namely $Z_{y_i} \sim N(0, 1)$. Regarding the actual measurement data, a corresponding $Z_{y_i}$ close to 0 indicates that the actual measurement value approaches the central value of the specification. The equations for standardization are listed as follows:

$$Z_{y_i} = \frac{y_i - \bar{y}}{\sigma_y}, i = 1, 2, \cdots, n \quad (1)$$

$$\bar{y} = \frac{1}{n}(y_1 + y_2 + \cdots + y_n) \quad (2)$$

$$\sigma_y = \sqrt{\frac{1}{n-1}[(y_1 - \bar{y})^2 + (y_2 - \bar{y})^2 + \cdots + (y_n - \bar{y})^2]} \quad (3)$$

wherein $y_i$ is the i-th actual measurement value, $Z_{y_i}$ is the standardized i-th actual measurement value, $\bar{y}$ is the mean of all the actual measurement values, and $\sigma_y$ is the standard deviation of all the actual measurement values.

The explanation herein adopts a neural-network (NN) algorithm as the conjecture algorithm for establishing the conjecture model performing virtual measurement, and uses such as a multi-regression (MR) algorithm to be the reference algorithm for establishing the reference model that serves as a comparison base for the conjecture model. However, the present invention can also apply other algorithms to be the conjecture algorithm or the reference algorithm, provided the reference algorithm differs from the conjecture algorithm, such as a time series algorithm and other related algorithms, and thus the present invention is not limited thereto.

When the NN and MR algorithms are utilized, if their convergence conditions both are that SSE (Sum of Square Error) is minimized with n→∞, their standardized predictive measurement values (defined as $Z_{y_{N_i}}$ and $Z_{y_{r_i}}$ respectively) should be the same as the standardized actual measurement value $Z_{y_i}$. Restated, when n→∞, $$Z_{y_i} = Z_{y_{N_i}} = Z_{y_{r_i}}$$

all represent the standardized actual measurement value, but they have different names due to having different purposes and different estimating models. Hence, $$Z_{y_{N_i}} \sim N(\mu_{Z_{y_i}}, \sigma^2_{Z_y}) \text{ and } Z_{y_{r_i}} \sim N(\mu_{Z_{y_i}}, \sigma^2_{Z_y})$$

indicate that $Z_{y_{N_i}}$ and $Z_{y_{r_i}}$ share the same statistical distribution. However, owing to the existence of different estimating models, the estimations of mean and standard deviation differ between those two prediction algorithms. Namely the standardized mean-estimating equation $$\left(\hat{\mu}_{Z_{y_i}} = Z_{\hat{y}_{N_i}}\right)$$

and standard-deviation-estimating equation $$\left(\hat{\sigma}_{Z_y} = \hat{\sigma}_{Z_{\hat{y}_N}}\right)$$

with respect to the NN conjecture model differ from the standardized mean-estimating equation $$\left(\hat{\mu}_{Z_{y_i}} = Z_{\hat{y}_{r_i}}\right)$$

and standard-deviation-estimating equation $$\left(\hat{\sigma}_{Z_y} = \hat{\sigma}_{Z_{\hat{y}_r}}\right)$$

with respect to the MR reference model.

The RI is designed to gauge the reliance level of the virtual metrology value. The RI thus should consider the degree of similarity between the statistical distribution $Z_{\hat{y}_{N_i}}$ of the virtual metrology value and the statistical distribution $Z_{y_i}$ of the actual measurement value. However, when virtual metrology is applied, no actual measurement value can be used to verify the trustworthiness of the virtual metrology value. (Notably, virtual metrology becomes unnecessary if actual measurement values are obtained.) Instead, the present invention adopts the statistical distribution $Z_{\hat{y}_{r_i}}$ estimated by the reference algorithm which is such as the MR algorithm to replace $Z_{y_i}$. The reference algorithm also can be such as a time-series algorithm and other related algorithms, and thus the present invention is not limited thereto.

Figure 2:
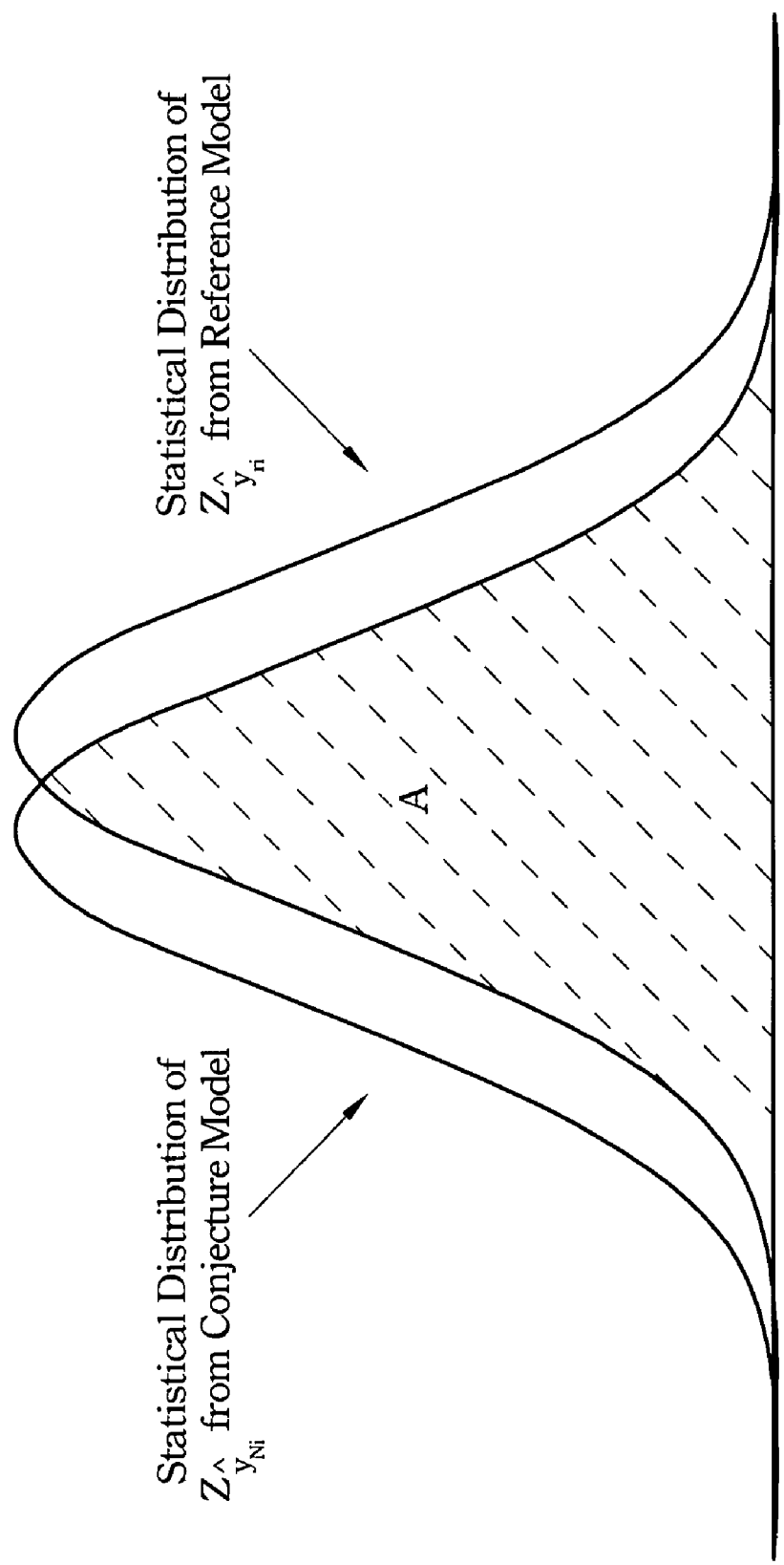
FIG. 2 is a schematic diagram for defining the reliance index (RI) according to the embodiment of the present invention.

Referring to FIG. 2, FIG. 2 is a schematic diagram for explaining the reliance index (RI) according to the preferred embodiment of the present invention. The RI of the present invention is defined as the intersection-area value (overlap area A) between the statistical distribution $Z_{\hat{y}_{N_i}}$ of the virtual metrology value from the conjecture model (built by such as the NN algorithm) and the statistical distribution $Z_{\hat{y}_{r_i}}$ of the reference prediction value from the reference model (built by such as the MR algorithm). As such, the RI equation is listed below:

$$RI = 2 \int_{\frac{Z_{\hat{y}_{N_i}} + Z_{\hat{y}_{r_i}}}{2}}^{\infty} \frac{1}{\sqrt{2\pi}\,\sigma} e^{-\frac{1}{2}\left(\frac{x-\mu}{\sigma}\right)^2} dx \quad (4)$$

with $\mu = Z_{\hat{y}_{N_i}}$ if $Z_{\hat{y}_{N_i}} < Z_{\hat{y}_{r_i}}$ $\mu = Z_{\hat{y}_{r_i}}$ if $Z_{\hat{y}_{r_i}} < Z_{\hat{y}_{N_i}}$ and $\sigma$ is set to be 1.

The RI increases with increasing overlap area A. This phenomenon indicates that the result obtained using the conjecture model is closer to that obtained from the reference model, and thus the corresponding virtual metrology value is more reliable. Otherwise, the reliability of the corresponding measurement value reduces with decreasing RI. When the distribution $Z_{\hat{y}_{N_i}}$ estimated from $Z_{y_{N_i}}$ is fully overlapped with the distribution $Z_{\hat{y}_{r_i}}$ estimated from $Z_{y_{r_i}}$, then according to the distribution theory of statistics, the RI value equals 1; and, when those two distributions are almost separate, the RI value approaches 0.

Hereinafter, the method for calculating the statistical distribution of the virtual metrology values ($Z_{\hat{y}_{N_i}}$ and $\hat{\sigma}_{Z_{\hat{y}_N}}$) from the conjecture model is explained.

In the NN conjecture model, if the convergence condition is to minimize SSE, then it can be assumed that "for given $Z_{x_{i,j}}$, $Z_{y_{N_i}}$ is the distribution with mean $\mu_{Z_{y_i}}$ and standard deviation $\sigma_{Z_y}$", namely for given $Z_{x_{i,j}}$, $Z_{y_{N_i}} \sim N(\mu_{Z_{y_i}}, \sigma_{Z_y}^2)$, where the NN estimating equation of $\mu_{Z_{y_i}}$ is $\hat{\mu}_{Z_{y_i}} = Z_{\hat{y}_{N_i}}$, and the NN estimating equation of $\sigma_{Z_y}^2$ is $\hat{\sigma}_{Z_y}^2 = \hat{\sigma}_{Z_{\hat{y}_N}}^2$.

Before the NN conjecture model is constructed, the process data must be standardized. The equations for standardizing the process data are presented below:

$$Z_{x_{i,j}} = \frac{x_{i,j} - \overline{x}_j}{\sigma_{x_j}}, i = 1, 2, \cdots, \quad (5)$$

$$n, n+1, \cdots, m; j = 1, 2, \cdots, p$$

$$\overline{x}_j = \frac{1}{n}(x_{1,j} + x_{2,j} + \ldots + x_{n,j}) \quad (6)$$

$$\sigma_{x_j} = \sqrt{\frac{1}{n-1}[(x_{1,j} - \overline{x}_j)^2 + (x_{2,j} - \overline{x}_j)^2 + \ldots + (x_{n,j} - \overline{x}_j)^2]} \quad (7)$$

wherein $x_{i,j}$ is the j-th process parameter in the i-th set of process data, $Z_{x_{i,j}}$ is the standardized j-th process parameter in the i-th set of process data;

$\overline{x}_j$ is the mean of the j-th process data;

$\sigma_{x_j}$ is the standard deviation of the j-th process data.

The n sets of standardized process data ($Z_{x_{i,j}}$, i=1,2, . . . , n; j=1,2, . . . , p) and the n standardized actual measurement values ($Z_{y_i}$, i=1,2, . . . , n) are utilized to build the NN conjecture model. The m sets of standardized process data ($Z_{x_{i,j}}$, i=1,2, . . . , m; j=1,2, . . . , p) are then inputted into the NN conjecture model to obtain the corresponding standardized virtual metrology values: $Z_{\hat{y}_{N_1}}, Z_{\hat{y}_{N_2}}, \ldots, Z_{\hat{y}_{N_n}}, Z_{\hat{y}_{N_{n+1}}}, \ldots, Z_{\hat{y}_{N_m}}$.

Accordingly, the estimated value of $\mu_{Z_{y_i}}$ (i.e. $\hat{\mu}_{Z_{y_i}} = Z_{\hat{y}_{N_i}}$) and the estimated value of $\sigma_{Z_y}$ (i.e. $\hat{\sigma}_{Z_y} = \hat{\sigma}_{Z_{\hat{y}_N}}$) can be computed as follows:

$$\hat{\mu}_{Z_{y_i}} = Z_{\hat{y}_{N_i}}, i = 1, 2, \cdots, n, n+1, \cdots, m \quad (8)$$

$$\hat{\sigma}_{Z_{\hat{y}_N}} = \quad (9)$$

$$\sqrt{\frac{1}{n-1}\left[\left(Z_{\hat{y}_{N_1}} - \overline{Z}_{\hat{y}_N}\right)^2 + \left(Z_{\hat{y}_{N_2}} - \overline{Z}_{\hat{y}_N}\right)^2 + \ldots + \left(Z_{\hat{y}_{N_n}} - \overline{Z}_{\hat{y}_N}\right)^2\right]}$$

$$\overline{Z}_{\hat{y}_N} = \frac{1}{n}\left(Z_{\hat{y}_{N_1}} + Z_{\hat{y}_{N_2}} + \ldots + Z_{\hat{y}_{N_n}}\right) \quad (10)$$

wherein $\overline{Z}_{\hat{y}_N}$ is the mean of the standardized virtual metrology values.

Hereinafter, the method for calculating the reference predication values $(Z_{\hat{y}_{r_i}}$ and $\hat{\sigma}_{Z_{\hat{y}_r}})$ from the MR model is explained.

The basic assumption of the MR is that "for given $Z_{x_{i,j}}$, $Z_{y_{ri}}$ is the distribution with mean $\mu_{Z_{yi}}$ and standard deviation $\sigma_{Z_y}$", namely for given $Z_{x_{i,j}}$, $Z_{y_{ri}} \sim N(\mu_{Z_{yi}}, \sigma_{Z_y}^2)$, wherein the MR estimating equation of $\mu_{Z_{yi}}$ is $\hat{\mu}_{Z_{yi}} = Z_{\hat{y}_{ri}}$, and the MR estimating equation of $\sigma_{Z_y}^2$ is $\hat{\sigma}_{Z_y}^2 = \hat{\sigma}_{Z_{\hat{y}_r}}^2$.

To obtain the MR relationship between the n sets of standardized process data $(Z_{x_{i,j}}, i=1,2,\ldots,n; j=1,2,\ldots,p)$ and the n standardized actual measurement values, $(Z_{yi}, i=1,2,\ldots,n)$, the weighting factors $\beta_r = [\beta_{r0}, \beta_{r1}, \beta_{r2}, \ldots, \beta_{rp}]^T$ corresponding to those p parameters must be defined by using the MR analysis. The relationship between $Z_{y_i}$ and $Z_{x_{i,j}}$ thus is constructed as follows:

$$\beta_{r0} + \beta_{r1}Z_{x_{1,1}} + \beta_{r2}Z_{x_{1,2}} + \ldots + \beta_{rp}Z_{x_{1,p}} = Z_{y_1}$$
$$\beta_{r0} + \beta_{r1}Z_{x_{2,1}} + \beta_{r2}Z_{x_{2,2}} + \ldots + \beta_{rp}Z_{x_{2,p}} = Z_{y_2}$$
$$\ldots$$
$$\beta_{r0} + \beta_{r1}Z_{x_{n,1}} + \beta_{r2}Z_{x_{n,2}} + \ldots + \beta_{rp}Z_{x_{n,p}} = Z_{y_n}$$
(11)

Let $$Z_y = \begin{pmatrix} Z_{y_1} \\ Z_{y_2} \\ \vdots \\ Z_{y_n} \end{pmatrix}$$
(12)

and $$Z_x = \begin{pmatrix} 1 & Z_{x_{1,1}} & \ldots & Z_{x_{1,p}} \\ 1 & Z_{x_{2,1}} & \ldots & Z_{x_{2,p}} \\ \vdots & \vdots & \ddots & \vdots \\ 1 & Z_{x_{n,1}} & \ldots & Z_{x_{n,p}} \end{pmatrix}$$
(13)

The least square method can obtain the estimating equation of $\beta_r$, $\hat{\beta}_r = [\hat{\beta}_{r0}, \hat{\beta}_{r1}, \ldots \hat{\beta}_{rp}]^T$ as $$\hat{\beta}_r = (Z_x^T Z_x)^{-1} Z_x^T Z_y$$
(14)

Therefore, the MR reference model can be obtained as $$Z_{\hat{y}_{ri}} = \hat{\beta}_{r0} + \hat{\beta}_{r1}Z_{x_{i,1}} + \hat{\beta}_{r2}Z_{x_{i,2}} + \ldots + \hat{\beta}_{rp}Z_{x_{i,p}}$$

$$i = 1, 2, \ldots, n, n+1, \ldots, m \quad (15)$$

Hence, during the conjecture phase, after inputting a set of process data, its MR estimating value $Z_{\hat{y}_{ri}}$ corresponding thereto can be obtained via equation (15). The MR estimating equation of the standard deviation $\sigma_{Z_y}$ is $$\hat{\sigma}_{Z_{\hat{y}_r}}$$

with $$\hat{\sigma}_{Z_{\hat{y}_r}} = \sqrt{\frac{1}{n-1}\left[\begin{array}{c}(Z_{\hat{y}_{r_1}} - \overline{Z}_{\hat{y}_r})^2 + \\ (Z_{\hat{y}_{r_2}} - \overline{Z}_{\hat{y}_r})^2 + \ldots + (Z_{\hat{y}_{r_m}} - \overline{Z}_{\hat{y}_r})^2\end{array}\right]} \quad (16)$$

$$\overline{Z}_{\hat{y}_r} = \frac{1}{n}(Z_{\hat{y}_{r_1}} + Z_{\hat{y}_{r_2}} + \ldots + Z_{\hat{y}_{r_n}}) \quad (17)$$

After obtaining the NN estimating equations $(Z_{\hat{y}_{N_i}}$ and $\hat{\sigma}_{Z_{\hat{y}_N}})$ and the MR estimating equations $(Z_{\hat{y}_{r_i}}$ and $\hat{\sigma}_{Z_{\hat{y}_r}})$, their normal distribution curves can be depicted, as illustrated in FIG. 2. Thus, the RI of each virtual metrology value can be derived by calculating the intersection area value (overlap area A).

After obtaining the RI, the RI threshold value ($RI_T$) must be defined. If $RI > RI_T$, then the reliance level of the virtual metrology value is acceptable. A systematic approach for determining the $RI_T$ is described below.

Before determining the $RI_T$, it is necessary to define a maximal tolerable error limit ($E_L$). The error of the virtual metrology value is an absolute percentage of the difference between the actual measurement value $y_i$ and $\hat{y}_{Ni}$ obtained from the NN conjecture model divided by the mean of all the actual measurement values, $\overline{y}$, namely $$Error_i = \left|\frac{y_i - \hat{y}_{Ni}}{\overline{y}}\right| \times 100\% \quad (18)$$

Figure 3:
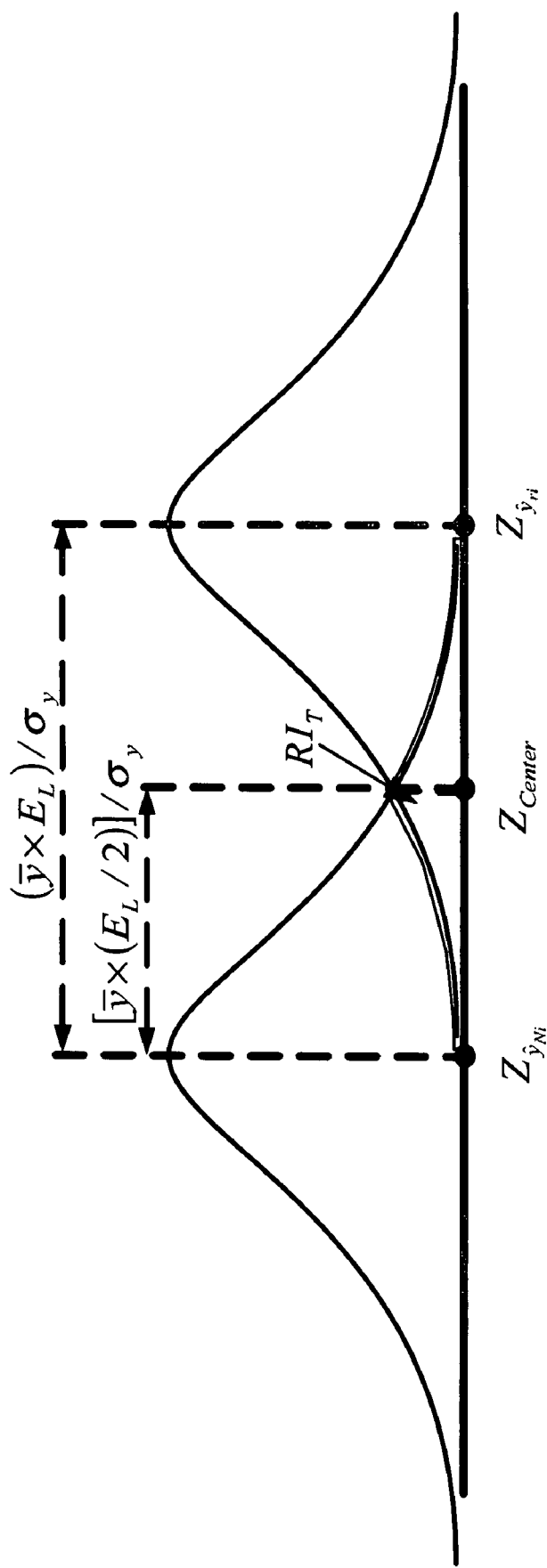
FIG. 3 is a schematic diagram for defining the RI threshold ($RI_T$) according to the embodiment of the present invention.

The $E_L$ can then be specified based on the error defined in equation (18) and the accuracy specification of virtual metrology (VM). Consequently, $RI_T$ is defined as the RI value corresponding to the $E_L$, as shown in FIG. 3. That is $$RI_T = 2\int_{Z_{Center}}^{\infty} \frac{1}{\sqrt{2\pi}\,\sigma} e^{-\frac{1}{2}\left(\frac{x-\mu}{\sigma}\right)^2} dx \quad (19)$$

with $\mu$ and $\sigma$ defined in equation (4) and $$Z_{Center} = Z_{\hat{y}_{Ni}} + [\overline{y} \times (E_L/2)]/\sigma_y \quad (20)$$

where $\sigma_y$ is specified in equation (3).

Global Similarity Indexes (GSI)

As mentioned above, when virtual metrology is applied, no actual measurement value is available to verify the accuracy of the virtual metrology value. Therefore, instead of the standardized actual measurement value $Z_{y_i}$, the standardized MR prediction value $Z_{\hat{y}_{r_i}}$ is adopted to calculate the RI. This substitution may cause inevitable gauging errors in the RI. To compensate for this unavoidable substitution, a global similarity index (GSI) is provided to help the RI gauge the reliance level of virtual metrology and identifying the key process parameters with large deviations (z score values).

The GSI assesses the degree of similarity between any set of process data and the model set of process data. This model set is derived from all of the sets of historical process data used for building the conjecture model.

The present invention may utilize a statistical distance measure, such as Mahalanobis distance, to quantify the degree of similarity. Mahalanobis distance is a distance measure introduced by P.C. Mahalanobis in 1936. This measure is based on correlation between variables to identify and analyze different patterns of sample sets. Mahalanobis distance is a useful way of determining similarity of an unknown sample set to a known one. This method considers the correlation of the data set and is scale-invariant, namely it is not dependent on the scale of measurements. If the data set has high similarity, the calculated Mahalanobis distance calculated will be relatively small.

The present invention uses the calculated GSI (applying Mahalanobis distance) size to determine whether the newly input set of process data is similar to the model set of process data. If the calculated GSI is small, the newly input set is relatively similar to the model set. Thus the virtual metrology value of the newly input (high-similarity) set is relatively accurate. On the contrary, if the calculated GSI is too large, the newly input set is somewhat different from the model set. Consequently, the virtual metrology value estimated in accordance with the newly input (low-similarity) set has low reliance level in terms of accuracy.

The equations to calculate the standardized process data $Z_{x_{i,j}}$ of the conjecture model are shown in equations (5), (6) and (7). At first, the model set of the process parameters is defined as $X_M = [x_{M,1}, x_{M,2}, \ldots, x_{M,p}]^T$, where $x_{M,j}$ equals $\bar{x}_j$, $j=1,2,\ldots,p$, so that each element in the model set after standardization (also denoted as the standardized model parameter, $Z_{M,j}$) has a value of 0. Restated, all of the elements in $Z_M = [Z_{M,1}, Z_{M,2}, \ldots, Z_{M,p}]^T$ are 0. Thereafter, the correlation coefficients between the standardized model parameters are calculated.

Assuming that the correlation coefficient between the s-th parameter and the t-th parameter is $r_{st}$ and that there are k sets of data, then $$r_{st} = \frac{1}{k-1}\sum_{l=1}^{k} z_{sl} \cdot z_{tl} = \frac{1}{k-1}(z_{s1} \cdot z_{t1} + z_{s2} \cdot z_{t2} + \ldots + z_{sk} \cdot z_{tk}) \quad (21)$$

After calculating the correlation coefficients between the standardized model parameters, the matrix of correlation coefficients can be obtained as $$R = \begin{bmatrix} 1 & r_{12} & \cdots & r_{1p} \\ r_{21} & 1 & \cdots & r_{2p} \\ \vdots & \vdots & \ddots & \vdots \\ r_{p1} & r_{p2} & \cdots & 1 \end{bmatrix} \quad (22)$$

Assuming that the inverse matrix ($R^{-1}$) of R is defined as A, then $$A = R^{-1} = \begin{bmatrix} a_{11} & a_{12} & \cdots & a_{1p} \\ a_{21} & a_{22} & \cdots & a_{2p} \\ \cdots & \cdots & \cdots & \cdots \\ a_{p1} & a_{p2} & \cdots & a_{pp} \end{bmatrix} \quad (23)$$

Hence, the equation for calculating the Mahalanobis distance ($D_\lambda^2$) between the standardized λ-th set process data ($Z_\lambda$) and the standardized model set process data ($Z_M$) is as follows.

$$D_\lambda^2 = (Z_\lambda - Z_M)^T R^{-1}(Z_\lambda - Z_M) \quad (24)$$
$$= Z_\lambda^T R^{-1} Z_\lambda$$

Finally, we have $$D_\lambda^2 = \sum_{j=1}^{p}\sum_{i=1}^{p} a_{ij} z_{i\lambda} z_{j\lambda} \quad (25)$$

The GSI of the standardized λ-th set process data is, then, equal to $D_\lambda^2/p$.

After obtaining the GSI, the GSI threshold ($GSI_T$) should be defined. Generally, the default $GSI_T$ is assigned to be two to three times the maximal $GSI_a$ (the subscript "a" stands for each historical set during the training phase).

After presenting the algorithms related to the RI and GSI, the operating procedure of the dual-phase virtual metrology system of the present invention is explained below.

Please continuously refer to FIG. 1. After the conjecture model 60, the reference model of the reliance index module 40, and the statistical distance model of the similarity index module 50 are built, a virtual metrology step can be performed on the workpieces in the cassette 80. In general, only one workpiece 82 of the workpieces in the cassette 80 is selected and sent to the measurement equipment 30 for actual measurement, and it generally takes several hours (for example, 6 hours) to obtain the actual measurement result of the selected workpiece 82. The conjecture model 60, the reliance index module 40, and the similarity index module 50 generate virtual metrology values with respect to the workpieces in the cassette 80 in two phases (phase-one and phase-two), wherein the virtual metrology values in each phase are accompanied with reliance indexes and global similarity indexes for assisting in gauging the degree of reliance of the virtual metrology values. The so-called phase-one virtual metrology value and its accompanying reliance index and global similarity index are obtained by promptly inputting the process data of each workpiece into the conjecture model 60, the reliance index module 40, and the similarity index module 50 as soon as the collection of the process data thereof is completed. The so-called phase-two virtual metrology value is obtained after the actual measurement value of the selected workpiece 82 is obtained from the measurement equipment 30, wherein the actual measurement value of the workpiece 82 and its related process data are added to the sets of historical process data and the historical measurement values to retrain or tune the conjecture model 60, the reference model of the reliance index module 40, and the statistical distance model of the similarity index module 50, and then a phase-two virtual metrology value and its accompanying reliance index and global similarity index are calculated by those retrained or tuned models.

Hereinafter, the steps of dual-phase algorithm 62 are explained below.

Figure 4:
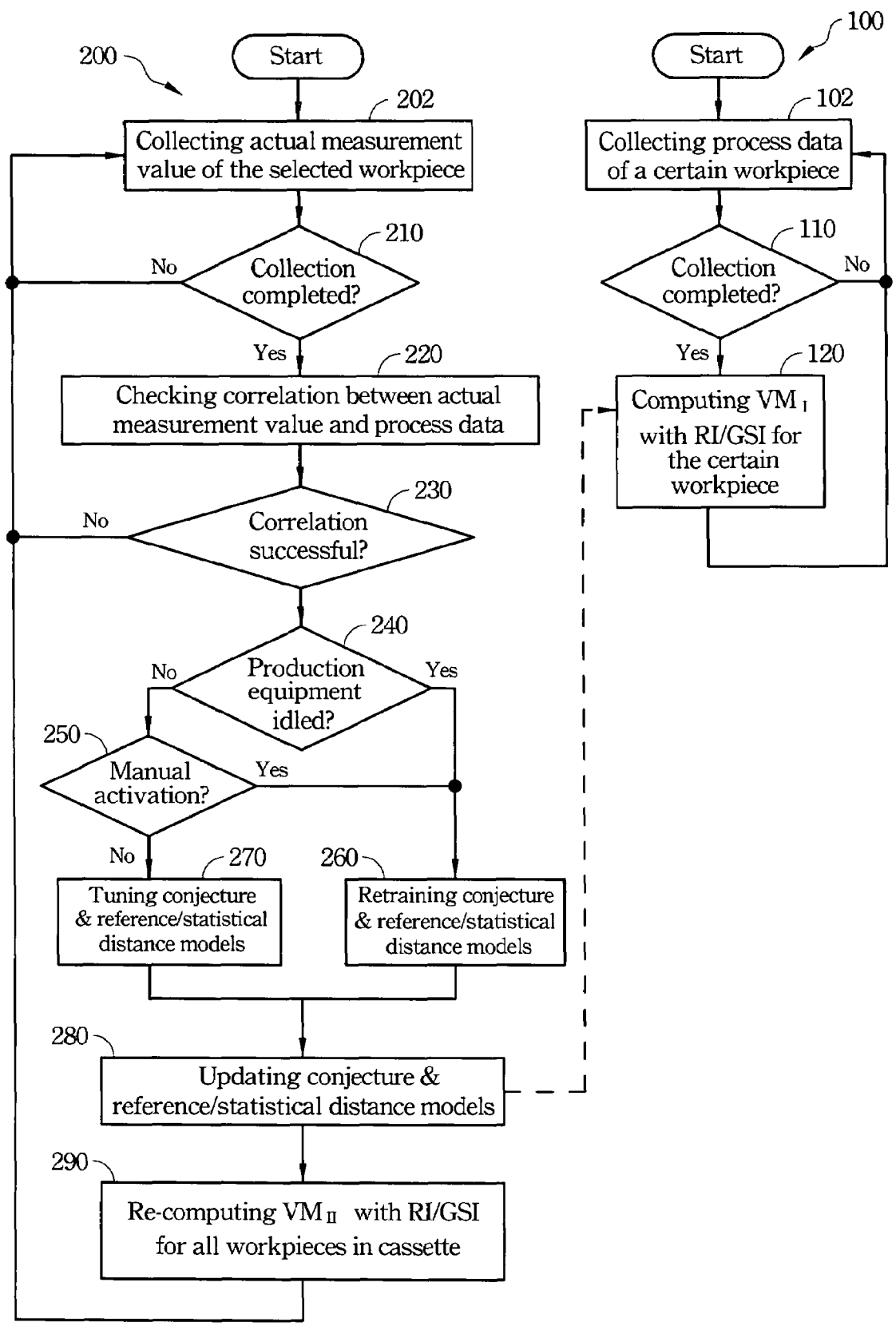
FIG. 4 is a schematic flow chart of a dual-phase virtual metrology conjecture algorithm according to the embodiment of the present invention.

Referring to FIG. 1 and FIG. 4, FIG. 4 is a schematic flow chart of the dual-phase algorithm according to the embodiment of the present invention. After the conjecture model 60, the reference model of the reliance index module 40, and the statistical distance model of the similarity index module 50 are built, this embodiment starts waiting for collecting the process data of each workpiece from the production equipment 20. As soon as the collection of the process data of a certain workpiece is completed, a phase-one conjecture step 100 is promptly performed (triggered). When the actual measurement of the selected workpiece 82 is obtained from the measurement equipment 30, a phase-two conjecture step 200 is performed (triggered).

Hereinafter, an illustrative example related to the entire workpieces in one single cassette 80 is presented for explaining the phase-one conjecture step 100 and the phase-two conjecture step 200. However, this embodiment is also applicable to the workpieces in a plurality of cassettes, and thus is not limited thereto.

In the phase-one conjecture step 100, step 102 is performed for collecting the process data of a certain workpiece (which can be the selected workpiece 82 or any one workpiece in the cassette 80). Thereafter, step 110 is performed for checking if the collection of the process data of the certain workpiece is completed. When the result of step 110 is false (i.e. "No"), step 102 is continuously performed; and, when the result of step 110 is true (i.e. "Yes"), step 120 is performed for computing a virtual metrology value for the certain workpiece and its accompanying reliance index and global similarity index, i.e. a phase-one virtual metrology value ($VM_I$) with its RI/GSI.

In the phase-two conjecture step 200, step 202 is performed for collecting the actual measurement value (metrology data) of a certain workpiece (the selected workpiece 82). Thereafter, step 210 is performed for checking if the collection of the actual measurement value of the selected workpiece 82 is completed. When the result of step 210 is false (i.e. "No"), step 202 is continuously performed; and, when the result of step 210 is true (i.e. "Yes"), step 220 is performed for checking a correlation between the actual measurement value and the process data to which the selected workpiece 82 is corresponding. Then, step 230 is performed for determining if the correlation is successful, i.e. if the actual measurement value and the process data belong to the same workpiece (i.e. the selected workpiece 82). When the result of step 230 is false (i.e. "No"), step 202 is continuously performed; and, when the result of step 230 is true (i.e. "Yes"), step 240 is performed for determining if the production equipment 20 has been idled for a predetermined period of time. When the result of step 240 is false (i.e. "No"), step 250 is performed for checking if an instruction of manual activation is issued. When the result of step 250 is false (i.e. "No"), step 270 is performed for tuning the conjecture model 60, the reference model of the reliance index (RI) module 40, and the statistical distance model of the similarity index (SI) module 50. The so-called tuning is based on a set of process data and actual measurement value currently obtained for the selected workpiece to adjust the weighting values or parameter values of the respective models, and it only takes several seconds to complete the tuning. When the result of step 250 or step 240 is true (i.e. "Yes"), meaning that the instruction of manual activation is issued (generally during maintenance or part replacement); or the properties of the production equipment 20 have relatively large changes, then step 260 has to be performed for retraining the conjecture model 60, the reference model of the reliance index module 40, and the statistical distance model of the similarity index module 50. The so-called retraining is to add the set of process data and actual measurement value currently obtained for the selected workpiece to the sets of historical process data and the historical measurement values so as to retrain the conjecture model 60, the reference model of the reliance index module 40, and the statistical distance model of the similarity index module 50, and it normally takes several minutes to complete the retraining.

After step 260 or 270, step 280 is performed for updating the conjecture model 60, the reference model of the reliance index module 40, and the statistical distance model of the similarity index module 50, and those new conjecture model 60, reference model, and statistical distance model also are provided to step 120 for computing a $VM_I$ with its RI/GSI for the next workpiece that has been subsequently manufactured by the production equipment 20. Meanwhile, step 290 is performed for using the new conjecture model 60, reference model and statistical distance model to re-compute the virtual metrology value and its accompanying reliance index and global similarity index, i.e. a phase-two virtual metrology value ($VM_{II}$) with its RI/GSI, for each workpiece in the entire cassette 80 to which the selected workpiece 82 belongs.

Since the generation of the phase-one virtual metrology value ($VM_I$) with its accompanying RI/GSI does not need to wait for the arrival of the actual measurement value of the selected workpiece and merely requires the process data of the corresponding workpiece, the phase-one virtual metrology value ($VM_I$) with its accompanying RI/GSI can be obtained promptly for the corresponding workpiece, thus meeting the requirement of promptness in virtual metrology. When the actual measurement value of the selected workpiece arrives, the conjecture model 60, the reference model and the statistical distance model can be tuned or retrained accordingly, and then the new models are used to re-compute the phase-two virtual metrology value ($VM_{II}$) and its accompanying reliance index and global similarity index for each workpiece in the entire cassette 80. All of the tuned or retrained models also are used to update the original models for predicting the subsequent phase-one virtual metrology value ($VM_I$) with its accompanying RI/GSI, thus assuring the requirement of accuracy in virtual metrology.

Figure 5:
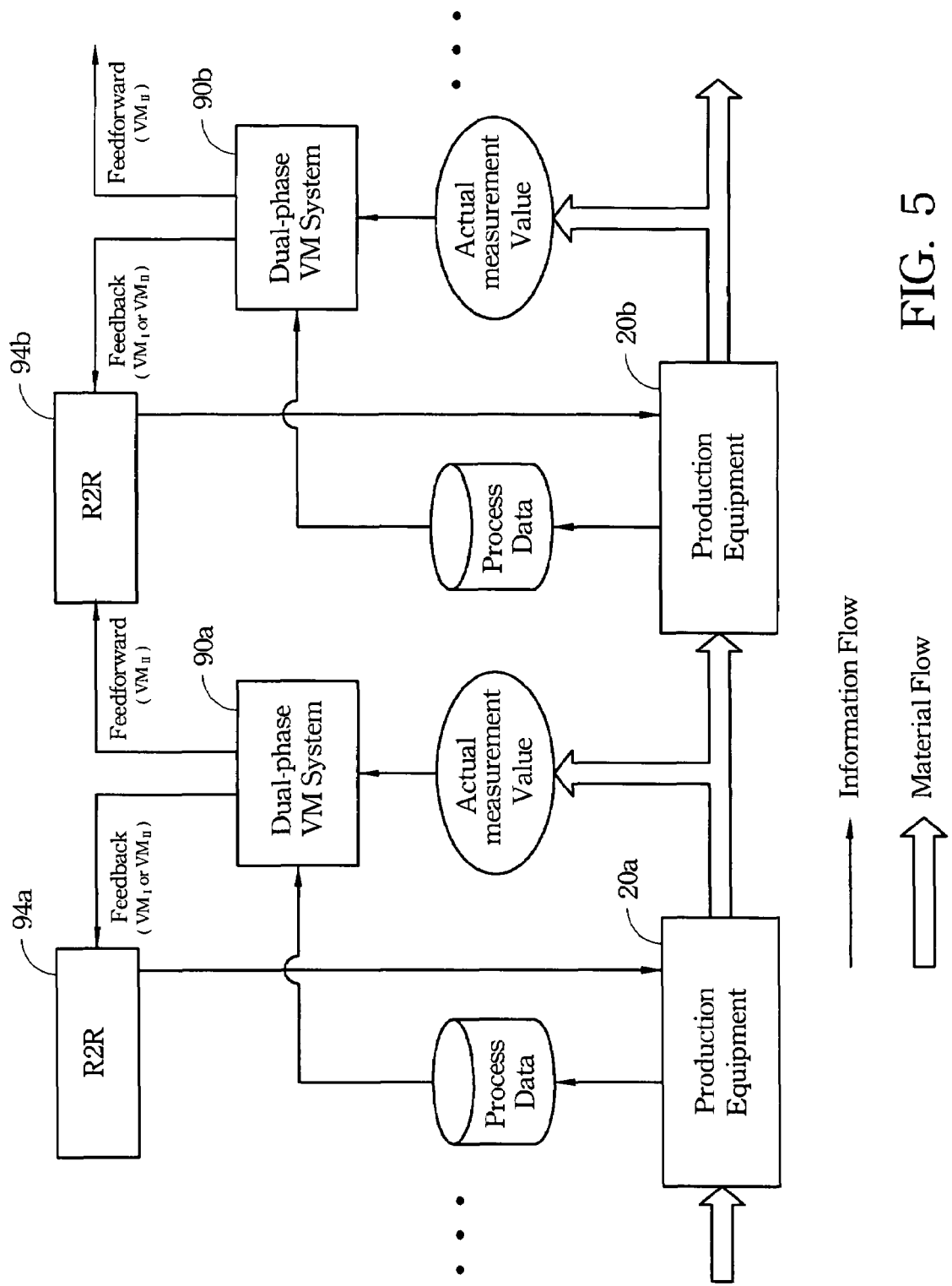
FIG. 5 is a schematic diagram showing a R2R control system to which the phase-one virtual metrology values and the phase-two virtual metrology values obtained from the embodiment of the present invention are applied.

Referring to FIG. 5, FIG. 5 is a schematic diagram showing a R2R control system to which the phase-one virtual metrology value and the phase-two virtual metrology value obtained from the embodiment of the present invention are applied, wherein a piece of production equipment 20a is the one on which the current process is being performed, such as a deposition machine; and a piece of production equipment 20b is the one on which the next process is to be performed, such as a CMP (Chemical Mechanical Polishing) machine. The embodiment of the present invention may be applied to a plurality of R2R control systems 94a and 94b in a foundry, for example, wherein the R2R control systems 94a and 94b may be L2L control systems or W2W control systems. When the R2R control systems 94a and 94b are W2W control systems, since a phase-one virtual metrology value ($VM_I$) can be promptly generated by a dual-phase VM system 90a (90b) used for thickness prediction of each workpiece, for example, and can be provided as feedback input to the W2W control system 94a (94b) of the production equipment 20a (20b), thereby meeting the requirement of promptness. On the other hand, a phase-two virtual metrology value ($VM_{II}$) has excellent accuracy, and thus can be provided for feedforward input to the W2W control system 94b of the production equipment 20b of the next process.

Further, when the R2R control systems 94a and 94b are L2L control systems, since the L2L control system does not have the promptness requirement of workpiece-by-workpiece measurement required by such as the W2W control system, the phase-two virtual metrology value ($VM_{II}$) can be provided as feedback input to the L2L control system 94a of the production equipment 20a, and as feedforward input to the L2L control system 94b of the production equipment 20b of the next process.

Following the operating procedure shown in FIG. 4, the results of the illustrative example compared to the actual measurement values are presented as follows.

Figure 6:
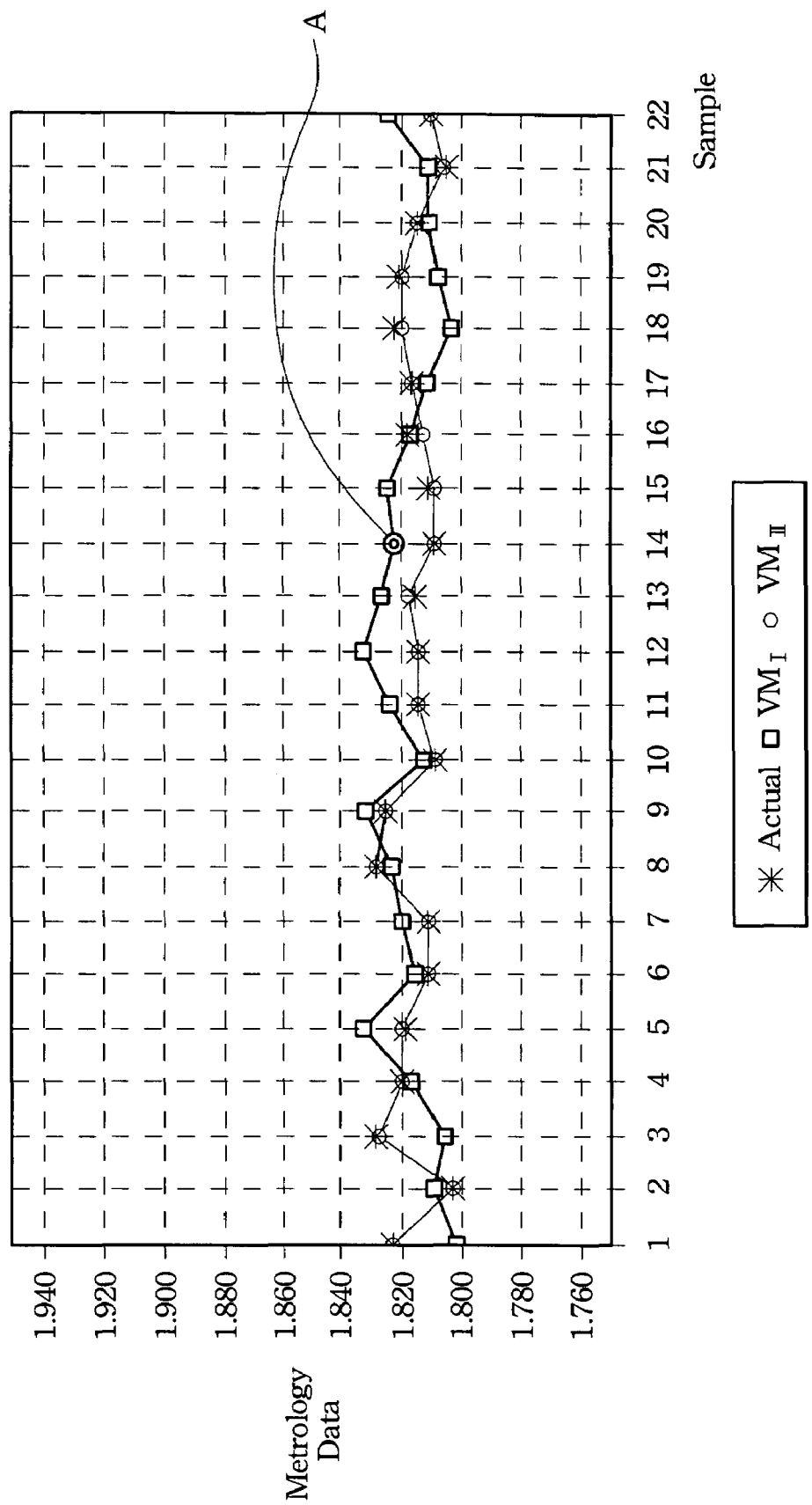
FIG. 6 is a schematic diagram showing the results of the phase-one virtual metrology values and phase-two virtual metrology values compared to the actual measurement values according to the application of the embodiment of the present invention.

Referring to FIG. 6, FIG. 6 is a schematic diagram showing the results of the phase-one virtual metrology values ($VM_I$) and phase-two virtual metrology values ($VM_{II}$) compared to the actual measurement values according to the application of the embodiment of the present invention, wherein the evaluation indexes, mean absolute percentage error (MAPE) and the maximum error (Max Error), are employed to evaluate the accuracy of $VM_I$ and $VM_{II}$. MAPE and Max Error of the $VM_I$ are 1.248% and 0.603%, respectively, and MAPE and Max Error of the $VM_{II}$ are 0.281% and 0.070%, respectively. It can be known from FIG. 6 that the phase-two virtual metrology values ($VM_{II}$) almost conform to the actual measurement values, and the errors of phase-one virtual metrology values ($VM_I$) also are quite small but still larger than the phase-two virtual metrology values ($VM_{II}$). Besides, the RI and GSI of a phase-one VM point A (sample 14) are over their respective thresholds, meaning that the $VM_I$ of sample 14 has lower reliance level.

It can be known from the preferred embodiment of the present invention that: the dual-phase virtual metrology method of the present invention can have the features of promptness (from $VM_I$) and accuracy (from $VM_{II}$), thus meeting the requirements of W2W control.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-phase virtual metrology method, comprising:
obtaining a plurality of sets of historical process data belonging to a production equipment;
obtaining a plurality of historical measurement values from a measurement equipment, wherein said historical measurement values are the measurement values of the workpieces which are manufactured in accordance with said sets of historical process data respectively;
establishing a first conjecture model by using said sets of historical process data and said historical measurement values, wherein said first conjecture model is built in accordance with a conjecture algorithm;
waiting for collecting the process data of a plurality of workpieces from said production equipment;
After the collection of the process data of one of said workpieces from said production equipment is completed, promptly performing a phase-one conjecture step, wherein said phase-one conjecture step comprises;
Inputting the process data of said one of said workpieces into said first conjecture model, thereby computing a phase-one virtual metrology value ($VM_I$); and
when the actual measurement value of a selected workpiece of said workpieces is obtained from said measurement equipment, performing a phase-two conjecture step, wherein said phase-two conjecture step comprises:
retraining said first conjecture model by adding the set of the process data and actual measurement value of said selected workpiece to said sets of historical process data and said historical measurement values; or tuning said first conjecture model by using the set of the process data and actual measurement value of said selected workpiece, thereby turning said first conjecture model into a second conjecture model;
inputting the process data of all the workpieces in a cassette belonging to said selected workpiece into said second conjecture model, thereby re-computing a phase-two virtual metrology value ($VM_{II}$) of each workpiece in said cassette; and
updating said first conjecture model with said second conjecture model for computing the phase-one virtual metrology value of the workpiece subsequently manufactured by said production equipment.

2. The method as claimed in claim 1, wherein said conjecture algorithm is selected from the group consisting of a multi-regression algorithm and a neural network (NN) algorithm.

3. The method as claimed in claim 1, further comprising:
establishing a first reference model by using said sets of historical process data and said historical measurement values, wherein said first reference model is built in accordance with a reference algorithm, and said conjecture algorithm is different from said reference algorithm; and
said phase-one conjecture step further comprising:
Inputting the process data of said one of said workpieces into said first reference model, thereby computing a first reference prediction value; and
calculating the overlap area between the statistical distribution of said phase-one virtual metrology value of said one of said workpieces and the statistical distribution of said first reference prediction value, thereby generating the reliance index (RI) of said phase-one virtual metrology value of said one of said workpieces, wherein the reliance index is higher when the overlap area is larger, representing that the reliance level of said phase-one virtual metrology value corresponding to the reliance index is higher.

4. The method as claimed in claim 3, wherein said reference algorithm is selected from the group consisting of a multi-regression algorithm and a neural network algorithm.

5. The method as claimed in claim 3, wherein said phase-two conjecture step comprises:
retraining said first reference model by adding the set of the process data and actual measurement value of said selected workpiece to said sets of historical process data and said historical measurement values; or tuning said first reference model by using the set of the process data and actual measurement value of said selected workpiece, thereby turning said first reference model into a second reference model; and inputting the process data of all the workpieces in said cassette belonging to said selected workpiece into said second reference model, thereby re-computing a second reference prediction value of each workpiece in said cassette; and respectively calculating the overlap area between the statistical distribution of said phase-two virtual metrology value of each workpiece in said cassette and the statistical distribution of said second reference prediction value, thereby generating the reliance index of said phase-two virtual metrology value of each workpiece in said cassette, wherein the reliance index is higher when the overlap area is larger, representing that the reliance level of said phase-two virtual metrology value corresponding to the reliance index is higher.

6. The method as claimed in claim 5, further comprising; updating said first reference model with said second reference model for computing the reliance index of the phase-one virtual metrology value of the workpiece subsequently manufactured by said production equipment.

7. The method as claimed in claim 5, wherein when said production equipment has been idled for a predetermined period of time, retraining said first conjecture model and said first reference model by adding the set of the process data and actual measurement value of said selected workpiece to said sets of historical process data and said historical measurement values, thereby turning said first conjecture model and said first reference model into said second conjecture and said second reference model.

8. The method as claimed in claim 1, further comprising:
establishing a first statistical distance model by using said sets of historical process data in accordance with a statistical distance algorithm; and inputting the process data of said one of said workpieces obtained from said production equipment into said first statistical distance model, thereby computing the global similarity index (GSI) for the process data corresponding to said phase-one virtual metrology value of said one of said workpieces.

9. The method as claimed in claim 8, wherein said statistical distance algorithm is a Mahalanobis distance algorithm.

10. The method as claimed in claim 8, wherein said phase-two conjecture step comprises:

retraining said first statistical distance model by adding the process data of said selected workpiece to said sets of historical process data; or tuning said first statistical distance model by using the process data of said selected workpiece, thereby turning said first statistical distance model into a second statistical distance model; and inputting the process data of all the workpieces in said cassette belonging to said selected workpiece into said second statistical distance model, thereby re-computing the global similarity index for the process data corresponding to said phase-two virtual metrology value of each workpiece in said cassette.

11. The method as claimed in claim 10, wherein when said production equipment has been idled for a predetermined period of time, retraining said first statistical distance model by adding the process data of said selected workpiece to said sets of historical process data, thereby turning said first statistical distance model into said second conjecture and said second statistical distance model.

12. The method as claimed in claim 10, further comprising; updating said first statistical distance model with said second statistical distance model for computing the global similarity index for the process data corresponding to the phase-one virtual metrology value of the workpiece subsequently manufactured by said production equipment.

13. The method as claimed in claim 1, further comprising; performing a process data preprocessing step for deleting all the anomalous process data and selecting important parameters from the process data of each of said workpieces obtained from said production equipment.

14. The method as claimed in claim 1, further comprising; performing a metrology data preprocessing step for filtering out anomalous data in the actual measurement value of said selected workpiece.

15. The method as claimed in claim 1, wherein the phase-one virtual metrology value and phase-two virtual metrology value of each workpiece in said cassette are applied in a R2R (Run-to-Run) control system of a foundry.

16. The method as claimed in claim 15, wherein said R2R control system comprises:

a first W2W (Workpiece-to-Workpiece) control system and a second W2W control system, wherein the phase-one virtual metrology value of each workpiece in said cassette is provided as feedback input to said first W2W control system of said production equipment, and the phase-two virtual metrology value of each workpiece in said cassette is provided as feedforward input to said second W2W control system of the production equipment on which the process performed is next to the process on said production equipment.

17. The method as claimed in claim 15, wherein said R2R control system comprises:

a first L2L (Lot-to-Lot) control system and a second L2L control system, wherein the phase-two virtual metrology value of each workpiece in said cassette is provided as feedback input to said first L2L control system of said production equipment and feedforward input to said second L2L control system of the production equipment on which the process performed is next to the process on said production equipment.

* * * * *